United States Patent

[11] 3,587,352

| [72] | Inventor | Nobutake Ougi<br>Tokyo, Japan |
|---|---|---|
| [21] | Appl. No. | 822,171 |
| [22] | Filed | May 6, 1969 |
| [45] | Patented | June 28, 1971 |
| [32] | Priority | May 13, 1968 |
| [33] | | Japan |
| [31] | | 43-31768 |

[54] HYDRAULIC CONTROL SYSTEM FOR AN AUTOMATIC TRANSMISSION MECHANISM
5 Claims, 9 Drawing Figs.

| [52] | U.S. Cl. | 74/868 |
|---|---|---|
| [51] | Int. Cl. | B60k 17/00 |
| [50] | Field of Search | 74/868, 869, 757 |

[56] References Cited
UNITED STATES PATENTS

| 2,761,328 | 9/1956 | Herndon et al. | 74/869 |
|---|---|---|---|
| 3,000,230 | 9/1961 | Froslie | 74/869 |
| 3,159,051 | 12/1964 | Herndon et al. | 74/869 |
| 3,167,970 | 2/1965 | Wagner et al. | 74/868 |

*Primary Examiner*—C. J. Husar
*Attorney*—John Lezdey

ABSTRACT: A hydraulic control system for an automatic transmission mechanism for an automotive vehicle to provide a constant shifting limit speed from second to first speed ratio without respect to the accelerator opening and also to enable the shifting from second to first speed ratio always at the same vehicle speed. This system comprises a 2-1 schedule valve for changing the drive through the transmission from second to first and a kickdown cutoff valve.

INVENTOR
NOBUTAKE OUGI
BY John Lesley
ATTORNEY

HYDRAULIC CONTROL SYSTEM FOR AN AUTOMATIC TRANSMISSION MECHANISM

The present invention relates to a control system for a power transmission mechanism in multiple speed ratios, and more particularly to a hydraulic control system for an automatic transmission of a vehicle.

Automatic transmission mechanism having planetary gear sets usually includes a plurality of friction elements, such as friction clutch and friction brake, to provide a plurality of gear ratios through selective coupling of the friction elements. To perform smooth shifting between the gear ratios, the hydraulic control systems are so constructed as to detect engine output power and vehicle speed and to change the capacity of the friction elements by regulating the actuating hydraulic pressure in relation to the detected values.

The torque of the friction elements, that is, the transmission torque of the friction clutch and braking torque of the friction brake, must be changed in accordance with the engine loads and vehicle speeds. The necessary torque capacity increases as the engine load increases and it must be relatively large at starting or low speed and relatively small at higher speeds. In the following description and claims, the "friction clutch" is intended to mean engageable and disengageable means to connect or disconnect torque transmission between rotatable members, the "friction brake" an engageable and disengageable means to clamp or release a rotatable member to the stationary portion of the transmission mechanism, and the "friction element" such friction clutch and friction brake.

If the torque capacity of such friction element is too small compared to necessary torque capacity at a given time, the slippage between the members to be clamped each other will be too much and thus an inaccurate operation or runaway of the engine will result. If, in contrast, the torque capacity of the friction element is too large, the clutch or brake will engage instantaneously and severe shocks will result. As the torque capacity depends on the level of the hydraulic pressure which actuates the hydraulic piston operating the friction element, smooth shift operation can be obtained without great slippage and without any uncomfortable shock by controlling the hydraulic pressure to minimize the difference between the torque capacity of the friction element and the necessary vehicles torque to be transmitted or braked.

In known vehicles, when a low-speed gear ratio is manually selected for an engine-braking effect while the vehicle is running at high-speed gear ratio, the actuating hydraulic pressure becomes lower than before as the engine is generally operating at lower output than before, so that the capacity of the friction element is accordingly small. This means that the engine-braking function will not be effective as the engaging friction brake slips in a great amount and does not serve to conclude the shifting abruptly.

In the automatic shifting between the gear ratios of the above-mentioned automatic transmission, the vehicle speed of the shifting point varies with the engine load; the vehicle speed become higher when a large driving torque is required with the engine load kept large, and the vehicle speed becomes lower when the necessary driving torque is relatively small with the engine load kept small. It follows that when a shift down is desired to achieve an effective engine brake, the automatic shift down can be performed only at a relatively lower vehicle speed, because in such case the engine load becomes relatively lower and the throttle opening becomes relatively smaller. To perform an automatic shift down in such case, therefore the accelerator pedal must be depressed. This depressing operation is in reverse action to apply a brake.

Therefore, it is a primary object of the present invention to provide a hydraulic control system for an automatic transmission in which means are provided to increase the level of the actuating hydraulic pressure at a high-speed and low engine torque operation, so that the capacity of the friction elements is increased and shifting to desired low-speed ratio is concluded abruptly.

It is another object of the present invention to provide the above-mentioned hydraulic pressure which is effected only at a predetermined manually selected position, so as not to result adverse effect to ordinary operation.

Still another object of the present invention is to provide such hydraulic control system, in which when the automatic transmission provides further low-speed ratio-shifting range having engine-braking effect, the increased hydraulic pressure decreases again to prevent excess shock by providing too large capacity of the engaging friction brake, as the difference between the gear ratios of the shifting stages is relatively large.

Another object of the present invention is to provide above-mentioned hydraulic control system in which when the automatic transmission provides means to automatic upshifting from low, intermediate speed to high speed, and the increase of hydraulic pressure is effected to the intermediate range, the hydraulic pressure will be great for the low to intermediate upshifting and results in excess shock, therefore, means are provided to prevent any increase of the hydraulic pressure at the upshifting.

A further object of the present invention is to provide above-mentioned hydraulic control system for providing a constant shifting limit speed from intermediate to low-speed ratio regardless of the accelerator opening.

A still another object of the present invention is to provide the above-mentioned hydraulic control system for enabling the shifting form the intermediate to low-speed ratio always at the same vehicle speed.

Further and more specific objects, features and advantages of the present invention are made apparent in the following detailed description of the preferred embodiments, by way of example only wherein the reference is made to the accompanying drawings, in which:

FIG. 1 is a diagrammatic illustration of a power transmission mechanism of the automatic transmission of a vehicle;

FIGS. 2A and B are a diagram of one embodiment of the hydraulic control system according to the present invention adapted for controlling the transmission shown in FIG. 1 wherein a selector lever is set at a neutral position;

Figure 1:
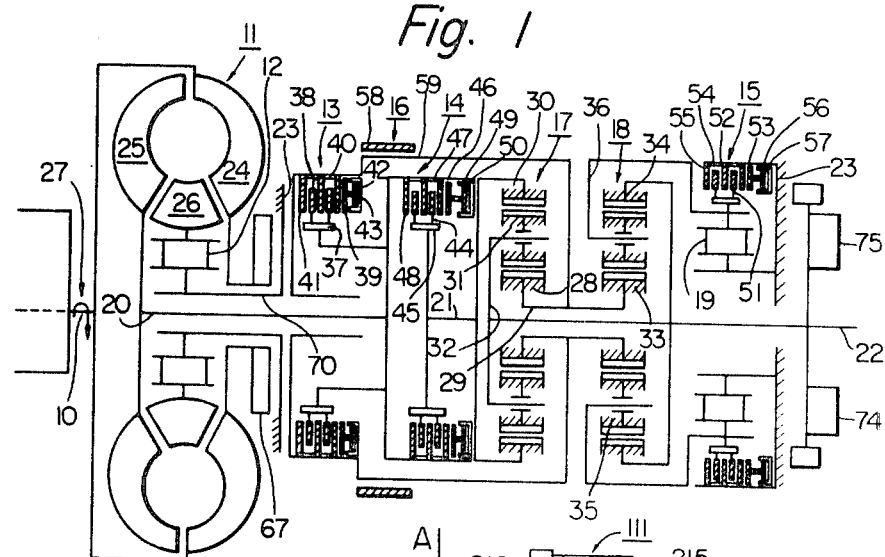

Referring to FIG. 1, which shows a schematic view of a power train in an automatic transmission which is controlled by a hydraulic control system according to the present invention, the train comprises a drive shaft 10 such as a crankshaft of the vehicle engine, a hydrodynamic torque converter 11 such as a hydraulic torque converter with one-way brake 12, hydraulically operated friction clutches 13 and 14, hydraulically operated friction brakes 15 and 16, planetary gear sets 17 and 18, a one-way brake 19, intermediate shafts 20 and 21, and a driven shaft 22 connected by any suitable means (not shown) with the driving road wheels of the vehicle. All of the shafts 10. 20, 21 and 22 are rotatably disposed with respect to the transmission housing 23 and the shafts 20 and 21 are in effect piloted with respect to the shafts 10 and 22.

The hydraulic torque converter 11 comprises a vaned impeller element 24, a vaned rotor or driven element 25 and a vaned stator or reaction element 26. The vaned elements 24 and 25 are disposed within a fluidtight casing (not shown) part of which is formed by the casing of the impeller 24. The impeller 24 is driven from the drive shaft 10. The rotor 25 is fixed to the first intermediate shaft 20, the stator 26 is rotatably disposed on a stationary sleeve 70 which is fixed to the transmission casing 23, and the one-way brake 12 is disposed between the stator and the sleeve.

The one-way brake 12 may be of any suitable construction and is so arranged as to allow a free rotation of the stator 26 in the forward direction of the vehicle, that is, in the same direction in which the drive shaft 10 rotates as indicated by the arrow 27 and prevents the rotation of the stator 26 in the reverse direction.

The torque converter 11 functions in a manner well known of such torque converters for driving the rotor or driven element 25 at an increased torque with respect to the torque impressed on the impeller 24 of the converter. The vanes of the stator 26 function to change the direction of the flow of fluid between the rotor and impeller so as to provide an increased torque to the driven element 25. In this case the reaction on the stator 26 takes place in the direction reverse to the rotation of the drive shaft 10, so that the one-way brake 12 engages and prevents the rotation of the stator in this direction. When the speed of the driven element or rotor 25 reaches a predetermined value, the reaction on the vanes of the stator 26 changes in direction, tending to rotate the stator in the forward direction, and the one-way brake 12 releases and allows such rotation of the stator. Here, the torque converter 11 functions as a simple fluid coupling to drive the rotor 25 at substantially the same speed and with no increase in torque with respect to the impeller 24.

The first planetary gear set 17 comprises a first sun gear 28 which is formed on a sleeve portion 29 which is rotatable on the driven shaft 22, a first ring gear 30 connected with the second intermediate shaft 21, a plurality of first planet gears 31 and a planet gear carrier 32 connected with the driven shaft 22. Each of the planetary gears 31 is in mesh with the sun gear 28 and also with the ring gear 30.

The second planetary gear set 18 comprises a second sun gear 33 formed on the sleeve portion 29 which is rotatable on the driven shaft 22 simultaneously with the first sum gear 28, a second ring gear 34 which is formed on the driven shaft 22, a plurality of second planet gears 35 and a planet gear carrier 36. Each of the planetary gears 35 is in mesh with such sun gear 33 and also with the ring gear 34.

The first clutch 13 is so arranged as to connect a drive portion 37 which is connected with the first intermediate shaft 20 with the sleeve portion 29 connected with the first and second sun gears 28 and 33 through a driven portion 40 connected thereto.

The first clutch 13 comprises a movable pressure plate 40 splined to the driven portion 40 and adapted to press the drive portion such as friction disc 38 and the driven portion such as friction disc 41 so as to frictionally engage them with each other, an annular piston 42 which is provided for actuating the movable pressure plate 39 and is slidably disposed within an annular cylinder 43. The pressure from the piston 42 is transmitted to the pressure plate 39, and the pressure in the cylinder 43 to actuating the movable piston is given by an hydraulic system as will hereinafter be described in detail.

The second clutch 14 is so arranged as to connect a drive portion 47 connected with the first intermediate shaft 20 with a driven portion 45 connected with second intermediate shaft 21.

The clutch 14 comprises a movable pressure plate 46 splined to a member 47 and adapted to press the drive portion such as a friction disc 44 and the driven portion such as a friction disc 48 so as to frictionally engage them with each other, an annular piston 49 which is provided for actuating the movable pressure plate 46 and is slidably disposed within an annular cylinder 50 for actuating the movable piston is given by a hydraulic system as will hereinafter be described in detail.

The second brake 15 is so arranged as to connect a drive portion 51 connected with the second planet gear carrier 36 with a driven portion 52 connected with the transmission housing 23.

The second brake 15 comprises a movable pressure plate 53 splined to a member 54 and adapted to press the drive portion such as a friction disc 51 and the driven portion such as a friction disc 52 so as to frictionally engage them with a member 55 which acts as a pressure member on the other side of the discs, an annular piston 56 which is provided for actuating the movable pressure plate 53 and is slidably disposed within an annular cylinder 57 for actuating the movable piston is given by an hydraulic system as will hereinafter be described in detail.

The one-way brake 19 may be of any suitable construction and is so arranged as to allow a free rotation of the drive portion 52 of the second brake 15 in the forward direction, that is, in the direction in which the drive shaft 10 rotates and prevents the rotation of the drive portion 52 thereof in the reverse direction.

The brake 16 comprises a brake band 58 mounted on a drum portion 59 for thereby braking the sun gears 28 and 33. Referring in particular to FIG. 2, it will be observed that one end 60 of the band 58 is fixed relative to the transmission casing 23 through a strut 61, and the other end 62 thereof, is fixed to a rod 63 for tightening the band on the drum portion 59 (FIG. 1) by means of an actuator 64 such as a hydraulic pressure servo for energizing hydraulically the band 58, which servo 64 comprises a hydraulic pressure chamber 65 for tightening the band 58 when hydraulically energized, and another hydraulic pressure chamber 66 for releasing the band 58 when hydraulically energized.

This power train also comprises a pump 67 which provides a hydraulic pressure for a hydraulic control system as will be described hereinafter in detail. This pump 67 may be of any suitable construction, and as shown in FIGS. 1 and 2 comprises an inner gear 68 in mesh with an eccentrically disposed outer gear 69. The inner gear 68 is connected in a manner to be driven by the drive shaft 10 through an impeller casing (not shown) by means of a sleeve shaft 70 (FIG. 1) fixed to the transmission casing, and the gears 68 and 69 are disposed in a pump casing (not shown) fixed relative to the transmission housing 23, and the pump casing comprises a crescent-shaped portion 71 disposed between the gears 68 and 69, as shown in FIG. 2A. The inner gear 68 is driven by the drive shaft 10 in a counterclockwise direction viewed from rear so that the outer gear 69 accordingly rotates in this direction, and the pump 67 is thus caused to pump from an inlet conduit 72 to a discharge conduit 200. The inlet conduit is so arranged as to draw fluid out of a transmission sump 73 formed by an oil pan fixed at the bottom of the transmission.

The power train shown in FIG. 1 also comprises governors 74 and 75 driven by the driven shaft 22 for detecting the output shaft speed.

In operation, the transmission has neutral condition and provides low-, intermediate- and high-speed ratios in forward drive and a drive in reverse.

TABLE I

| Speed | Engagement | | | | | |
| --- | --- | --- | --- | --- | --- | --- |
| | Clutch 13 | Clutch 14 | Brake 16 | Brake 15 | One-way brake | Engine braking |
| First | — | 0 | — | — | 0 | |
| Second | — | 0 | 0 | — | — | Middle. |
| Third | 0 | 0 | — | — | — | Low. |
| I first | — | 0 | — | 0 | — | High. |
| Reverse | 0 | — | — | 0 | — | Do. |
| Neutral | — | — | — | — | — | |

In the above table I, the sign "-" indicates the disengagement of the frictional element and the sign 0 shows the engagement of the frictional element.

As shown in the above table I, the transmission is in neutral condition in which no clutches and brakes are coupled.

Figure 2B:
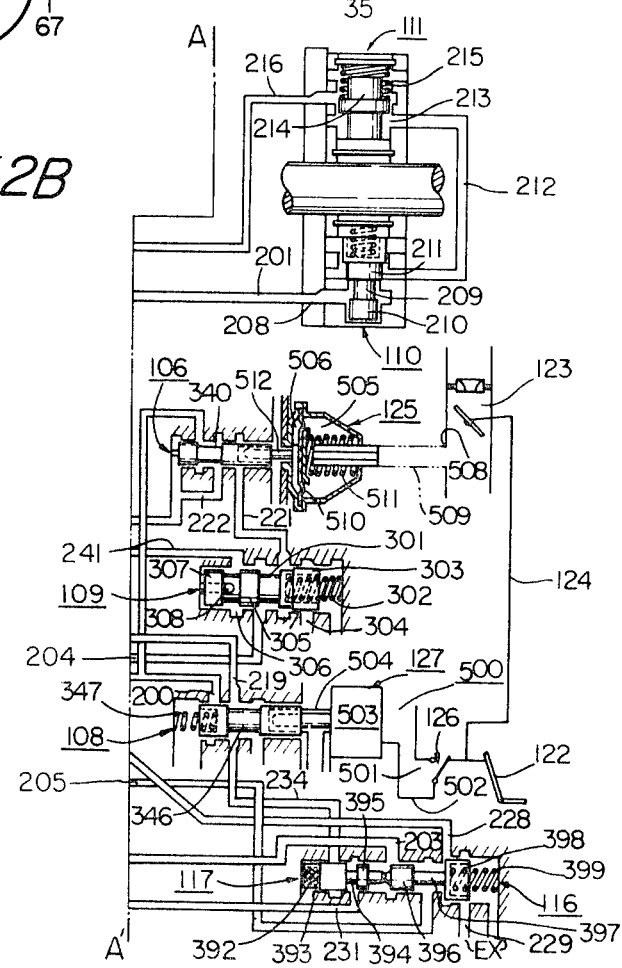
Figure 2A:
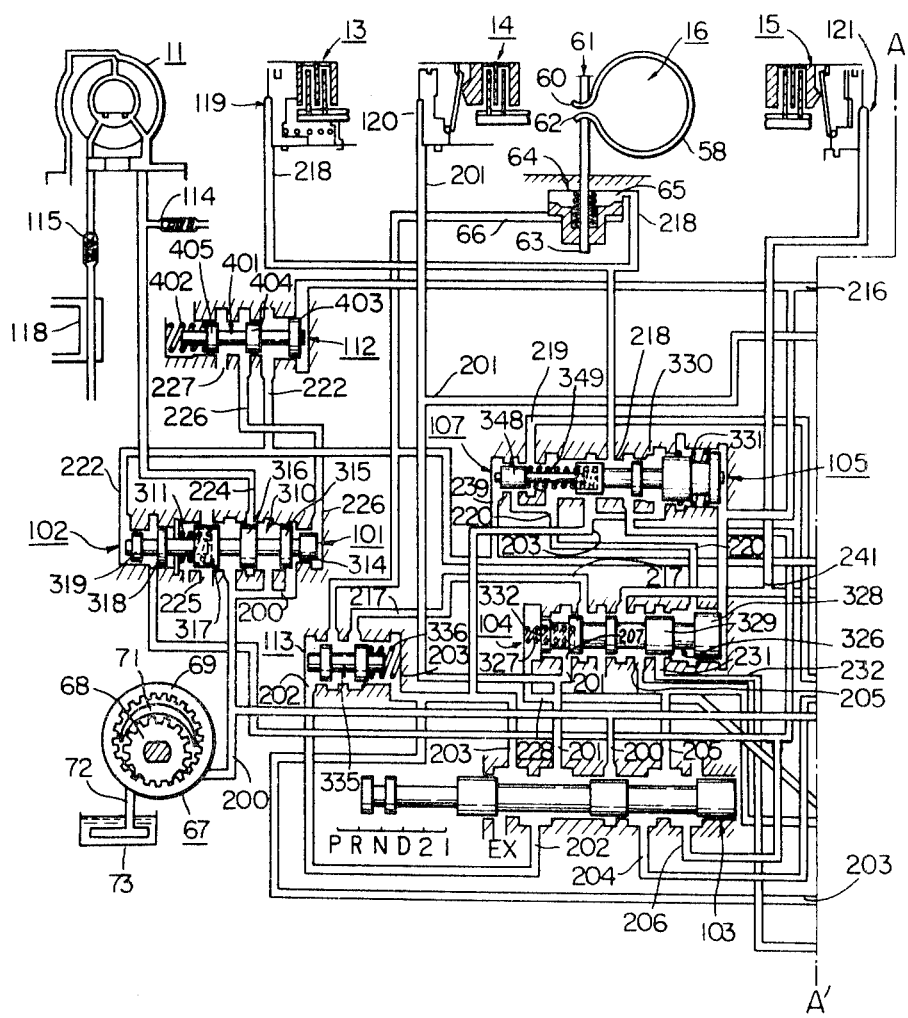

Referring now to FIGS. 2A and 2B, which shows a hydraulic control system for an automatic transmission according to the present invention, the system generally comprises an oil pump 67 to provide a source of hydraulic pressure; a primary main regulator valve 101 for regulating the fluid pressure from the pump 67 and applied to the pistons for various friction brakes and clutches of the transmission, a secondary main regulator valve 102 for regulating the fluid pressure in such a manner that the pressure increases in response to the decrease in the intake manifold vacuum and that the pressure also increases when the transmission is in reverse operation as will be described hereinafter; a manually operated selector valve 103 for controlling the distribution of the line pressure to said servo means in the transmission for operation in different forward speed ratios and in reverse and having an N or neutral position, a D or drive position, a 2 or second position, a 1 or first position; and R or reverse position, and a P or parking position; an automatic first (low) to second (intermediate) speed ratio shift valve 104 hereinafter designated as a 1-2 valve for changing the drive through the transmission from its first (low) forward speed ratio to its second (intermediate) forward speed ratio; and automatic second (intermediate) to third (high) ratio shift valve 105 hereinafter designated as a 2-3 shift valve for changing the drive through the transmission for the second forward speed ratio to its third forward speed ratio; a throttle valve 106 for preventing a throttle pressure that increases with the depression of the vehicle accelerator; an automatic second to third ratio shift plug 107 hereinafter designated as a shift plug for causing the 2-3 valve 105 to be actuated under the control of the throttle pressure for changing the drive through the transmission from its third to second speed ratio in response to the change in the throttle pressure; a kickdown valve 108 for shifting down the forward speed ration from its third to second or from its second to first speed position, a throttle backup position, 109 for providing a high position, pressure independently of the low throttle opening of the engine; a first governor valve 110 for providing a fluid pressure increasing with the increase of the output shaft speed; a second governor valve 111 for providing a fluid pressure to apply the 1-2 valve and 2-3 shift valve then the vehicle speed exceeds a predetermined value so as to shift the speed ratio between the first and second, and between the second and third speed ratios; a pressure modifier valve 112 for controlling the fluid pressure in response to the throttle pressure when the governor pressure is high and for controlling the fluid pressure so as to increase it stepwise when the governor pressure is low or substantially zero; a second speed-locking valve 113 for at all times maintaining the second speed independently of the changes of the governor pressure, vehicle speed and throttle pressure; a torque converter relief valve 114 for relieving the fluid pressure applied to the torque converter when it exceeds a predetermined value; a torque converter pressure keeping valve 115 for maintaining the fluid pressure in the torque converter at a predetermined constant pressure; a second to first speed ratio schedule valve 116 hereinafter designated as a 2-1 schedule valve for changing the drive through the transmission from its second forward speed ratio to first forward speed ratio when the manual selector valve 103 is shifted to the position 1; a kickdown cutoff valve 117 for cutting off the kickdown operation at the positions 1 and 2 of the manual selector valve 103; a cooler 118 for cooling the oil from the torque converter; a hydraulically operated actuator 119 for actuating the first clutch 13; a hydraulically operated actuator 120 for actuating the second clutch 14; a hydraulically operated actuator 121 for actuating the second brake 15. This system further comprises in addition to the above; an accelerator control or pedal 122 which has an ordinary mechanical connection with the carburetor butterfly valve 123 for the internal combustion vehicle driving the engine which may include a link 124 connecting the carburetor throttle valve with the accelerator pedal 122; a diaphragm assembly 125 for actuating the throttle valve 106; a kickdown switch 126 operated under the control of the accelerator pedal 122; and a kickdown solenoid 127 for actuating the kickdown valve 108 when energized.

In operation, the transmission and its hydraulic control system are controlled by the vehicle operator by means of the accelerator 122 of the vehicle and the manual selector lever (not shown) connected with the manual selector valve 103. The manual selector valve 103, as has been described, has six different positions of N or neutral position, D or drive position, 2 or second position, 1 or first position, R or reverse position, and P or parking position as indicated in FIG. 2, the drive range having low or first, intermediate or second and high or third speed ratio. The transmission is conditioned for various types of operation by moving the selector valve 103 to the positions corresponding to the type of a desired operation so as to distribute the fluid or line pressure into a predetermined line as designated in table II as follows:

TABLE II

| Selected position | P | R | N | D | 2 | 1 |
|---|---|---|---|---|---|---|
| Line: | | | | | | |
| 201 | — | — | — | 0 | 0 | 0 |
| 202 | — | — | — | 0 | 0 | — |
| 203 | — | — | — | 0 | — | — |
| 204 | 0 | 0 | — | — | 0 | 0 |
| 205 | 0 | 0 | — | — | — | 0 |
| 206 | — | 0 | — | — | — | — |

In the above table II, the sign "-" indicates no flow of the fluid pressure while the sign 0 shows the flow of the pressure to the line.

The transmission is maintained in its neutral condition with the manual selector valve 103 held in the neutral position as shown in FIG. 2. In this condition of the transmission and its hydraulic controls, the accelerator 122 is assumed to be in its closed throttle position, although the movement of the accelerator toward its open throttle position, when the manual selector valve 103 is in this position, exercises no effect on the condition of the transmission to complete a drive through it. The engine is started with the selector valve 103 in the neutral position, and prior to such operation of the engine, no fluid pressure exists in the hydraulic system since the pump 67 is not in operation. The pump 67 is driven from the transmission drive shaft 10 and thereby from the vehicle engine.

When the engine starts, the pump 67 driven by the engine supplies a line pressure to the conduit 200.

For forward driving, the transmission is ordinarily operated in the drive range in which low or first, intermediate or second and high or third speed ratio power trains are alternatively made effective for driving the driven shaft 22 and thereby and vehicle and in which the transitions between these three drives is automatically accomplished by the automatic control system.

The line pressure is supplied form the conduit 200 through the manual selector valve 103 to the conduit 201 and accordingly to the actuator 120, thereby holding the second clutch 14 at all times in a coupling position. The conduit 201 connects the selector valve 103 with the 1-2 valve, and the line pressure in the conduit 201 is thus supplied to the 1-2 valve, particularly to the port 207. In the first speed ratio of the drive range the spool 326 is urged by the spring 327 toward its rightmost position as shown in FIG. 2 thereby shutting off the line pressure to the first brake 16. The vehicle runs forward with the second clutch 14 engaged and with the one-way brake 19, whereupon due to the action of the one-way brake 19 which allows a free rotation of the drive portion 52 of the clutch in the forward direction, that is, in the direction in which the drive shaft 10 rotates and prevents the rotation of the drive portion 52 thereof in the reverse direction, the torque of the engine may not be transmitted from the driven shaft 22 to the drive shaft 10 so that an engine-braking action is not attained.

The throttle opening movement of the accelerator provides an additional power for driving the vehicle in this speed range, and this movement of the accelerator also exerts other effects on the hydraulic control system so as, for one thing, to increase the line pressure effective on the applying pistons associated with the second clutch 14 for increasing the applied pressures in these mechanisms and, for another thing, to increase the fluid pressure within the converter 11.

The conduit 201 connects the selector valve 103 with first governor valve 110. The line pressure, which increases in correspondence with the vehicle speed, is applied to the port 208 of the first governor valve 110 and thereby to the piston 209 which has a small land 210 and a larger land 211 so that the pressure difference therebetween causes the spool 209 to move so as to pass the line pressure from the conduit 201 through the first governor valve 110 into the conduit 212 and thereby to the port 213 of the second governor 111, in which the centrifugal force of the piston 214 becomes balanced with the compression of the spring 215 so that the second governor 111 generates a governor pressure increasing in response to the increase of the output shaft speed, which pressure is connected through the space produced by the balance with the conduit 216, which is connected with the rightmost end of the 1-2 valve. The spool 326 of the 1-2 valve 104 is thus moved leftwards of FIG. 2 with the result that the line pressure from the conduit 201 is connected with the conduit 217 which is connected through the second speed-locking valve 113 with the conduit 66 of the actuator 64 of the brake 16 so as to tighten the band 58 thereof with the result that the speed ratio is shifted to the second as shown previously in table I.

With the vehicle speed further increasing, the governor pressure from the second governor 111 correspondingly increases to move the 2-3 valve spool 330 leftwards against the compression of the spring 349 so that the line pressure from the conduit 203 connected with the manual selector valve 103 is introduced through the 2-3 valve to the conduit 218 connected with the conduit 65 of the actuator 64 of the brake 16 so as to release the band 58 of the first brake 16. On the other hand, the line pressure from the conduit 218 is applied to the actuator 119 of the first clutch 13 through the conduit 218 connected with the actuator 119 so as to provide a drive train of the third speed ratio between the drive shaft 10 and the driven shaft 22 as shown in FIG. 2.

Upon movement of the manual selector valve 103 to the position 2 in FIG. 2, the line pressure is supplied from the conduit 200 through the manual selector valve 103 to the conduit 201 and accordingly to the actuator 120 so that the line pressure always urges the second clutch 14 so as to engage the latter.

The line pressure is also supplied from the conduit 200 through the manual selector valve 103 to the second speed-locking valve 113 at its leftmost end through the conduit 202, but the rightmost end is now exhausted through conduit 203, with the result that the line pressure moves the spool 335 rightwards against the action of the spring 336 only. In D setting, although the 202 is pressurized, the conduit 203 is also pressurized so that, with equalized fluid pressure on both sides of the second-speed lock-valve 113, its spring 336 shifts it to the left. Thus, the line pressure from the selector valve 103 is supplied from the conduit 202 through the locking valve 113 to the conduit 66 of the actuator 64 to cause the band 58 of the brake 16 to be tightened. Thus, this provides a drive train of the second speed ratio between the shafts 10 and 22 as shown in FIG. 2, and this second speed ratio is maintained independently of the changes of the vehicle speed, throttle pressure and governor pressure.

When the manual selector valve 103 is set at the position 1 in FIG. 2, the line pressure is supplied from the conduit 200 through the manual selector valve 103 to the conduits 201, 204 and 205. The line pressure from the conduit 201 is supplied to the second clutch 14.

The line pressure is also supplied from the conduit 205 to the 1-2 valve and accordingly to the actuator 121 of the second brake 15 to cause the provision of the first speed ratio. With the vehicle speed increasing, the governor pressure to be applied to the rightmost end of the 1-2 valve from the conduit 216 correspondingly increases with the result that the pressure moves the 1-2 valve spool 326 leftwards similarly to that as previously described so that the line pressure from the conduit 201 connected with the manual selector valve 103 is supplied through the second speed locking valve 113 to the actuator 64 connected with the first brake 16 to cause the provision of the second speed ratio. While the manual selector valve is in the 1 position, the line pressure is not applied to the conduits 203 and 206 with the result that it does not supply the line pressure to the actuator 119 connected to the first clutch so that it does not provide the third speed ratio.

In the comparison of the operation of the first speed in the drive range with this first speed of the position 1 of the manual selector valve 103, the line pressure operates to energize the second brake 15 instead of the operation of the one-way brake with the result that the line pressure carries fixedly the carrier 36 of the second planetary gear set 18 so that the power from the driven shaft is transmitted to the drive shaft 10 thereby providing an engine-braking effect.

Upon movement of the manual selector valve 103 to the position R in FIG. 2, the line pressure is supplied from the conduit 200 to the conduits 204, 205 and 206. The line pressure in the conduit 205 is supplied through the 1-2 valve to the actuator 121 of the second brake 15 as previously described. The line pressure from the conduit 206 is supplied through the 2-3 valve to the relief side of actuator 64 of the first brake 16 and is also supplied to the actuator 119 of the first clutch 13 so that the driven shaft 22 is driven in a reverse direction by the drive shaft 10.

The governor pressure delivered from the conduit 216 is also applied to the rightmost end of the pressure modifier valve 112 so as to control the fluid pressure applied to the brake and clutches as will be hereinafter described in detail.

The kickdown circuit 500 in the hydraulic control system comprises in addition to the kickdown valve 108 for shifting down the forward speed ratio and including a spool 346 and a spring 347 for urgent the spool 346 rightwards in FIG. 2 and the accelerator 122; a kickdown switch 501 which closes its contact when the accelerator is depressed approximate 80 percent of the full stroke by the operator; a source of an electric energy 502; a kickdown solenoid device 503 which is electrically energized by an electric current from the source 502 when the accelerator 122 is fully depressed to close the contact of the switch 501 for projecting a rod 504 so as to move the kickdown spool 346 leftwards in the drawings against the spring 347.

In operation, when the accelerator 122 is fully depressed by the operator, the switch 501 becomes closed so that the solenoid device 503 becomes energized thereby with the result that the kickdown valve spool 346 is moved leftwards through the rod 504 whereby the line pressure from the conduit 200 is supplied through the kickdown valve 108 and a conduit 219 communicating with the 2-3 valve 105 in terms of kickdown pressure thereby urging the 2-3 shift valve spool 330 rightwards of the drawing and over balancing the governor pressure applied to the rightmost end of the 2-3 so as to shift down the gear ratio from the third to the second speed ratio, and the 2-3 valve pressure is also supplied through the 2-3 valve and the conduit 220 to the 1-2 valve 104 which has a larger land 328 and a smaller land 329.

In order to detect the engine power in the hydraulic control system so as to permit the throttle valve 106 to operate properly for causing the 2-3 valve 105 to be actuated under the control of the throttle pressure for changing the drive through the transmission from its third to its second speed ratio in response to the change of the throttle pressure, the throttle valve 106 is actuated by a diaphragm assembly 125 which comprises a vacuum chamber 505 communicating with the intake manifold 508 of the engine by a conduit 509, an atmospheric pressure chamber 506 communicating with the atmosphere, a diaphragm 510, a spring 511 disposed within the vacuum chamber 505 and urging the diaphragm 510 toward the atmospheric chamber 506. The vacuum generated in the intake manifold pulls the diaphragm 510 toward the vacuum chamber 505 against the compression of the spring 511 with the result that a rod 512 connected with the diaphragm 510 and disposed in the atmospheric pressure chamber 506 causes the throttle valve spool 340 to move rightwards so that the line pressure from the conduit 200 connected with the pump 67 is leaked through the throttle valve 106 and the conduit 221 to the oil sump (not shown) so as to reduce the line pressure with displacement of the rod 512 and with the variation in the engine power due to the change of the vacuum in the intake manifold. The throttle pressure delivered from the conduit 222 connected with the throttle valve 106 is applied to the secondary main regulator valve 102 and to the 2-3 shift plug 107 so that the line pressure is changed in response to the change of the throttle pressure and is raised when the engine power is increased. The throttle pressure thus actuates the 2-3 valve so as to shift the speed ratio in response to the change in the throttle pressure from the third speed ratio to the second speed ratio or vice versa.

The primary and secondary main regulator valves 101 and 102 function as follows: The fluid pressure delivered from the oil pump 67 is applied to the conduit 200 connected with the primary main regulator 101 which comprises a larger land 315 ad smaller land 314 mounted on the regulator valve spool 310 between which the fluid pressure is applied through the conduit 200 so that the spool 310 is moved thereby leftwards with the resulting increase of the fluid pressure the spool 310 correspondingly moves leftwards further to allow the fluid to pass through the conduit 224 connected with the primary main regulator valve 101 into the torque converter 11. As the fluid pressure further increases, the main regulator valve spool 310 moves leftwards of the drawing so as to permit the fluid pressure to leak into the oil sump through the conduit 225 to regulate the fluid pressure so as not to exceed a predetermined value. The line pressure to be delivered through the conduit 200 is thus controlled automatically in response to the balance between the fluid pressure applied to the difference in area between the smaller and larger lands 314 and 315, and the force applied from left side as will be described.

The secondary main regulator valve 102 functions as follows:

The secondary main regulator valve 102 receives the throttle pressure from the throttle valve 106 to the leftmost end of the secondary main regulator valve 102 so that the line pressure is increased in accordance with the opening of the throttle valve up to a predetermined value. As was described, when the fluid pressure delivered from the oil pump 67 is applied to between the smaller and larger lands 314 and 315 on the primary main regulator valve 101, the regulator valve spool 310 is thus moved leftwards against the throttle pressure valve applied from the leftmost end.

When the line pressure from the conduit 206 connected with the manual selector valve 103 is applied to between the larger and smaller lands 318 and 319 the secondary main regulator device valve spool 310 is moved rightwards of the drawing against the line pressure applied to between the smaller and larger lands 314 and 315.

Figure 5:
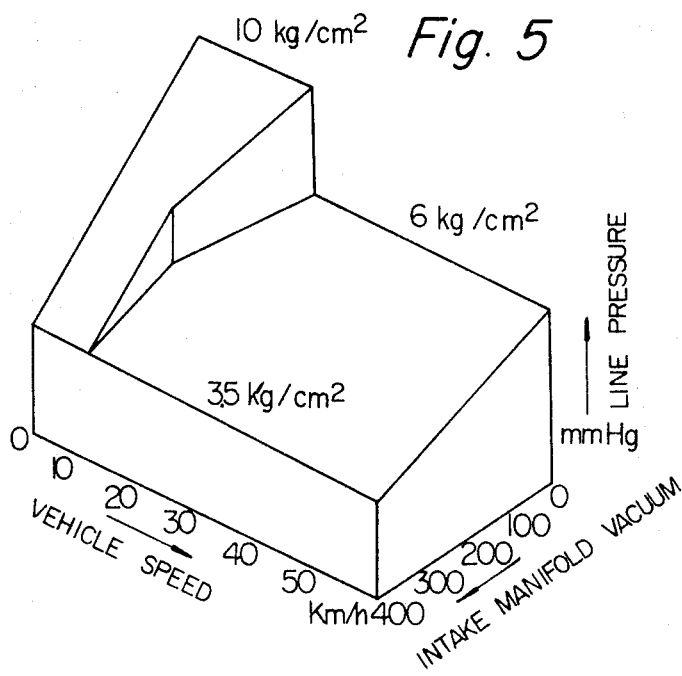
FIG. 5 is a graphical representation of line pressure in the hydraulic control system when the system is in D position or in the first gear ratio in 1 position.

The pressure modifier valve 112 functions as follows: The pressure modifier valve 112 receives the governor pressure from the conduit 216 connected with the second governor valve at the rightmost end of the control valve 112 against the action of the spring 402 which is disposed at the leftmost end of the control valve. The control valve 112 also receives the throttle pressure delivered from the throttle valve 106 through the conduit 222, which pressure is applied to between the larger and smaller lands 403 and 404 and is served to urge the control valve spool 401 rightwards because of the difference in size therebetween. It follows that if the force produced by the governor pressure overcomes the force produced by the spring 402 and throttle pressure the control valve spool 401 moves leftwards of the drawing so that the throttle pressure is applied through the conduit 226 to the rightmost end of the primary main regulator valve 101. Thus the throttle pressure is applied to the rightmost end of the primary main regulator valve 101 and to the leftmost end of the secondary main regulator valve 102. Since there is a difference in size between the smaller land 314 disposed at the rightmost end of the primary main regulator valve 101 and the larger land 319 disposed at the leftmost end of the secondary main regulator valve 102, the line pressure is regulated in accordance with the opening of the throttle valve 106. On the other hand, if the force produced by the governor pressure is lower than that produced by the action of the spring 402 and the throttle pressure the control valve spool 401 moves rightwards so that the conduit 226 communicates with the drain port 227, thus applying the throttle pressure entirely to the leftmost end of the secondary main regulator valve 102 with the resulting increase in the line pressure. As shown in FIG. 5, which shows a graph of the line pressure in terms of the vehicle speed and engine intake manifold vacuum, the line pressure is high at low vehicle speed and increases steeply as the throttle pressure increases, so that the capacity of the friction-engaging mechanism is increased to satisfy a demand for a larger torque transmission at low vehicle speed. As the vehicle speed increases, the throttle pressure is applied to both ends of the regulator drive valve and the line pressure decrease stepwise. If the line pressure gradually increases as the throttle pressure increases, a sufficient degree of torque transmission capacity is attained in the friction-engaging mechanism at higher speeds to prevent the shifting shock.

The throttle backup valve 109 comprises a throttle backup valve spool 301 and a spring 302 biasing the spool 301 leftwards and is connected through the conduit 221 to the throttle valve 106. The conduit 221 connected with the throttle backup valve 109 is exhausted when the spool 301 is energized as will be described in detail hereinafter, and when the line pressure in the conduit 204 is exhausted or when the selector valve 103 is selected to the drive position and also when the line pressure is applied through the conduit 241 to the leftmost end surface of the land 305 and urges the spool 301 rightwards against the force of the spring 302 to cause the conduit 204 to be closed and to cause the conduit 221 to communicate with the exhaust port 304, in both cases the conduit 221 is exhausted. As the line pressure in the conduit 204 is exhausted with the manual selector valve 103 selected to the drive position and as the conduit 241 is pressurized with the selector lever in the reverse position or first speed in 1 position, the conduit 221 of the throttle valve 106 is exhausted so that the throttle valve 106 delivers normal throttle pressure through the conduit 222 by permitting a portion of the fluid supplied through the conduit 200 to leak to the conduit 221.

Figure 6:
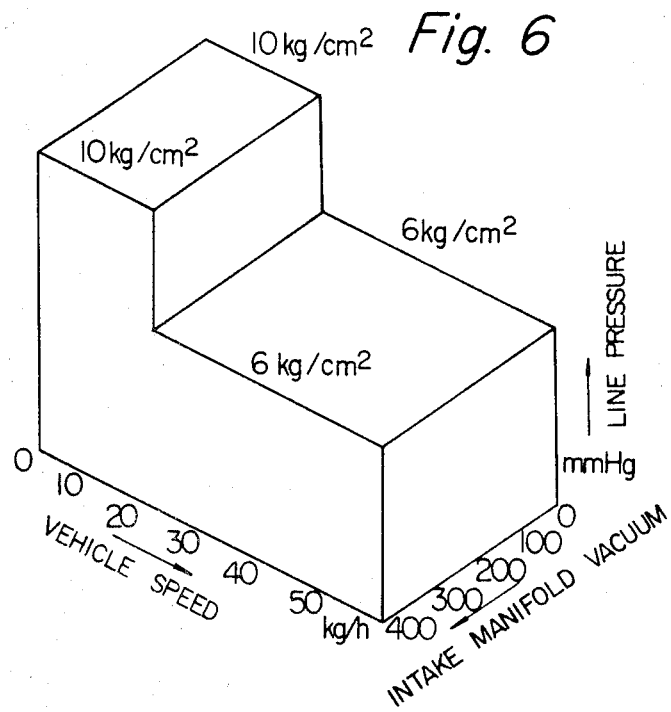
FIG. 6 is a graphical representation of line pressure in the hydraulic control system when the system is in 2 position or in the second gear ratio in 1 position.
Figure 7:
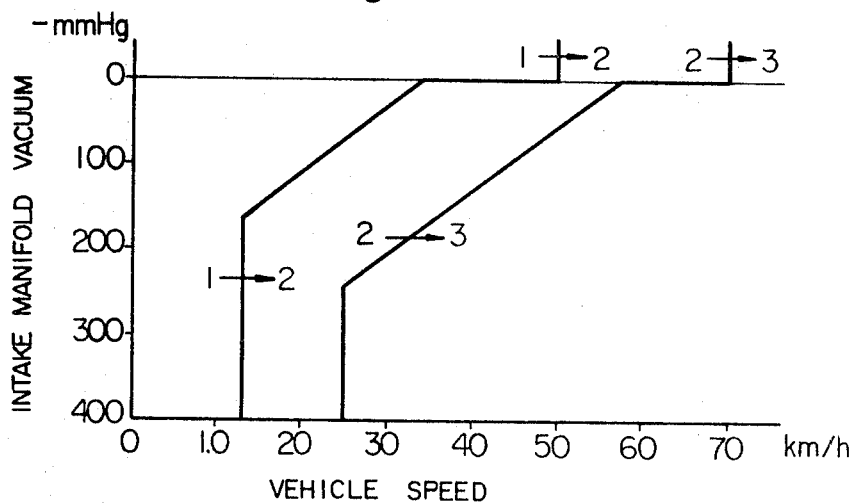
FIG. 7 is an upshift characteristics chart of D range in terms of the manifold vacuum and vehicle speed.

When the conduit 204 is pressurized and the passage 241 exhausted, i.e. when the manual selector valve 103 is set, at the 2 position of the manual selector valve, then the line pressure is applied to between the lands 304 and 303 of the spool 301 of the throttle backup valve 109. Due to the presence of a difference in area between the lands 305 and 303, the valve spool 301 is urged rightwards so that a greater portion of the conduit 204 is blocked by the land 305 and a portion of the exhaust port is uncovered by the land 303. Thus, a regulated fluid pressure prevails in the throttle backup valve 109 and the conduit 221. Since the pressure-regulating function of the diaphragm assembly 505 to the fluid pressure introduced into the conduit 222 is lost, a high pressure which is not affected by the vacuum in the intake manifold of the engine is produced at low throttle openings. It follows that the line pressure supplied through the conduit 200 and regulated by the throttle pressure 222 in the primary and secondary main regulator valves 101 and 102 is higher than the normal state and as shown in FIG. 6 is maintained at a constant level with all the variation in the engine manifold vacuum.

Thus, while the vehicle is running in a high-speed gear ratio or third-speed ratio, the conduit 203 is exhausted and a line pressure is introduced into the conduit 204, when the operator shifts the manual selector valve 103 to the 1 position to achieve the engine-braking function. Thus, the friction clutch 13 is released and, as the 1-2 valve 104 is urged to leftwards by the governor pressure though the conduit 216, the communication between the conduits 205 and 241 is obstructed and the line pressure supplied through the conduit 201 is guided through the 1-2 valve 14 and through the second speed locking valve 113 to the actuator 64 of the first brake 16 so as to tighten the band 14. In this case, since the operating condition of the engine is low throttle and high-speed, as shown by the forward portion of FIG. 5, the line pressure to engage the second brake 15 could be low causing the brake 15 to be slipped more. By providing the throttle backup valve 109, according to the invention so as to increase the line pressure at low selected position, the liner pressure is increased as shown in FIG. 6 at low throttle high-speed operating condition of the engine, with the result that the engine braking can be powerfully exerting at a higher vehicle speed, and moreover to alleviate a braking shock which will occur at a speed ratio change from a low-pressure control range to a high-pressure control range.

Figure 3:
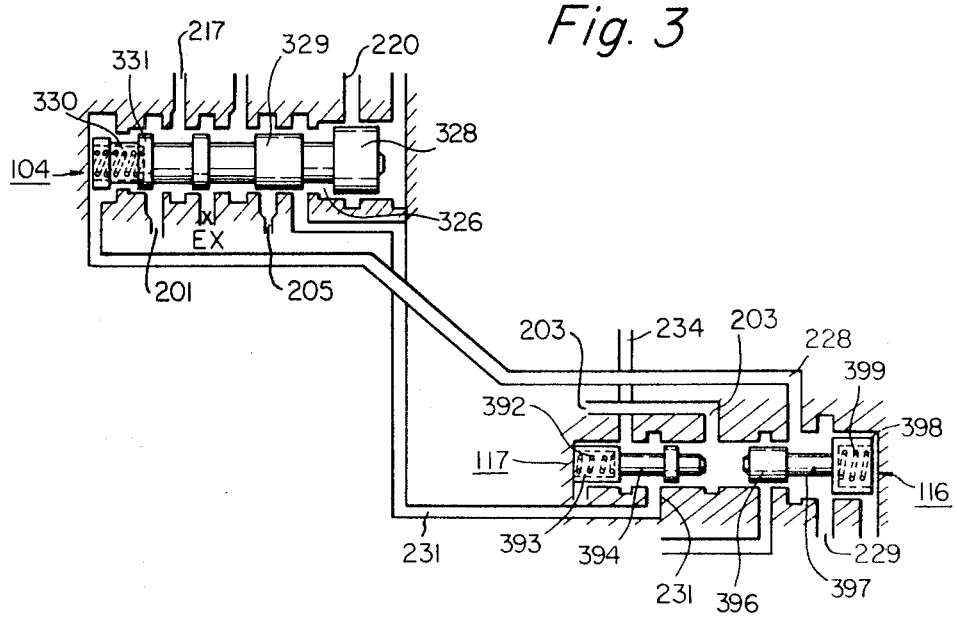
FIGS. 3 and 4 are partial schematic diagrams of a 2-1 schedule valve and kickdown cutoff valve with a 1-2 valve showing their operation.
Figure 4:
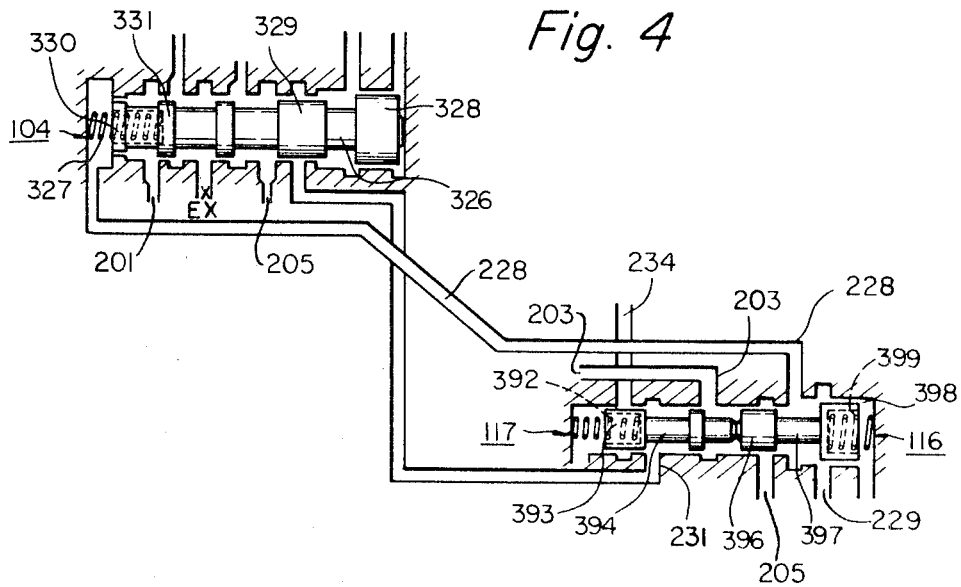

The second to first speed ratio schedule valve 116 functions, as shown in FIGS. 3 and 4, like this: When the manual selector valve 103 is shifted to the 1 position, the line pressure from the conduit 205 connected with the manual selector valve 103 passes through the 2-1 schedule valve 116 to the conduit 228 and then to the leftmost end of the 1-2 valve 104.

When the manual selector valve 103 is shifted to the D position, the line pressure from the conduit 203 connected with the manual selector valve 103 is supplied to the conduit 203 connected with the line 2-1 schedule valve 116 so as to urge the 2-1 schedule valve spool 397 rightwards against the compression of the spring 399 so that the conduit 228 communicates with the exhaust port 229, whereby a constant fluid pressure regulated by the combination of the exhaust 397, land 398 and spring 399 is derived and delivered through the conduit 228 connected with the 2-1 schedule valve to the leftmost end of the 1-2 valve.

Even though the manual selector valve 103 is shifted to the 2 position, the schedule valve 116 still remains inoperative because both of the conduits 203 and 205 are maintained to communicate with the exhaust port.

The kickdown valve 117 comprises the kickdown cutoff spool 394 and a spring 392 and is disposed axially on the same axis with the 2-1 schedule valve 116.

The kickdown cutoff valve 117 functions as follows: When the kickdown spool 394 moves to the leftmost end, the line pressure in the conduit 234 is applied to the 1-2 shift valve through to conduit 205. When the manual selector valve 103 is set to the D position, the kickdown cutoff spool 394 assumes a position as indicated in FIG. 3. Therefore, when the accelerator is fully depressed to provide a kickdown operation, the kickdown pressure in the conduit 234 is directed to the area between the larger and smaller lands 328 and 329 of the 1-2 shift valve 104 through the conduit 231. The result is that the 1-2 valve spool 326 is moved rightwards of the drawing against the governor pressure applied to the rightmost end of the 1-2 valve 104 so as to shift down the vehicle speed ratio from the second to first speed ratio. On the other hand, when the manual selector valve 103 is set to the 1 or 2 position, the conduit 203 is exhausted so that the kickdown cutoff spool 394 assumes a position as indicated in FIG. 4. Then, the communication between the conduits 205 and 241 is obstructed so that the 1-2 valve spool is not biased rightwards in the absence of a line pressure in the conduit 231.

The 1-2 valve 104 functions for kickdown as follows although briefly described previously:

When the manual selector valve is held in the drive position upon shifting from the first to second speed ratio, the governor pressure form the conduit 216 is applied to the rightmost end of the 1-2 valve, the line pressure from the conduit 201 is applied through the conduit 201 so as to bias the 1-2 valve spool 326 rightwards, and the spring 327 urges the spool 326 rightwards. While the 1-2 valve 104 is in the second speed ratio, the kickdown pressure delivered through the conduit 231 to the 1-2 valve 104, with the spring 327, urges the 1-2 valve spool valve spool 326 rightwards. In these cases, the line pressure delivered from the conduit 201 and the kickdown cutoff pressure changes in relation to the intake manifold vacuum. This means that the shifting speed from the first to second speed ratio and vice versa at the drive range changes in accordance into the intake manifold vacuum.

When the manual selector valve 103 is held in the 2 position, there exists no changes on shifting.

The manual selector valve 103 being held in the 1 position, the pressure delivered from the conduit 228 is applied to the leftmost end of the 1-2 valve 104, to cause the 1-2 valve spool 326 to move rightwards, and this pressure, with the spring 327 urges the 1-2 valve 104 rightwards. The pressure applied through the conduit 228 is in no relation to the intake manifold vacuum with the result that when the speed shifting occurs from the second to the first speed ratio the shifting speed is depending merely upon the governor pressure with the result that the speed ratio is always shifted at a constant vehicle speed.

When the manual selector valve 103 is held in the 1 position with the 1-2 valve spool 326 held at its leftmost position, the kickdown pressure delivered from the conduit 228 connected with the 1-2 schedule valve 116 is supplied through the conduit 228 to the 1-2 valve, the line pressure delivered from the conduit 201 applied through the conduit 201 between the smaller and larger lands 330 and 332, and the spring 327 urge the 1-2 valve spool 326 rightwards. Upon shifting from the first to second speed ratio additional rightwards force caused by the kickdown pressure applied through the conduit 220 is applied to the 1-2 valve spool 326 in its upshifter position in comparison with the shifting rightward force in the downshifter position speed ratio with the result that upshift from first to second takes place at higher speed than downshifting.

The aforementioned operation is listed in the following table III.

TABLE III

| Shifting | Conduit 230 | Area diff. lands 330 and 331 | Area diff. lands 329 and 328 | Govenor pressure |
|---|---|---|---|---|
| Drive: | | | | |
| 1-2 | | 0 | 0 | Δ |
| 2-1 | | | 0 | Δ |
| "1": | | | | |
| 1-2 | * | | 0 | Δ |
| 2-1 | * | | | Δ |

Here, the sign O shows the pressure which changes in accordance with the intake manifold vacuum, "*" the constant pressure independent to the intake manifold vacuum, and "γ" the pressure which varies with the vehicle speed.

The advantages of the 2-1 schedule valve 116 and kickdown cutoff valve 117 used in the system of the present invention will now be described hereinafter in the following:

When the manual selector valve 103 is held in the drive position, the kickdown cutoff valve 117 has its valve spool 394 biased to the leftmost position with the result that when the throttle pedal or accelerator is fully depressed thereby to supply the line pressure 200 to the conduit 219, the line pressure is applied to the conduit 231 which is connected directly with the 1-2 valve 104.

The manual selector valve 103 being held in the 2 position, the vehicle is kept at the second speed due to the operation of the second speed-locking valve 113, whereupon the line pressure is maintained at a high pressure.

Figure 8:
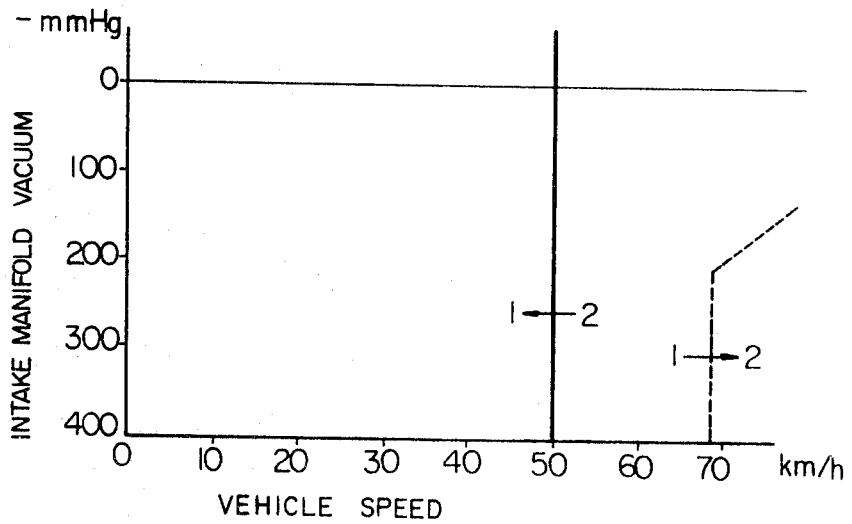
FIG. 8 is a downshift characteristics chart of L range in terms of the manifold vacuum and vehicle speed.

When the selector is held in the 1 position in the second speed, a constant pressure is delivered to the conduit 205 which is connected through the conduit 228 to the leftmost end of the 1-2 valve, so that if the vehicle speed decreases down the value for overcoming the pressure by the governor pressure from the conduit 216 it urges the 1-2 valve spool rightwards with the result that the speed is shifted down to the first speed. Thereupon, the conduit 231 is shut off by the kickdown cutoff valve 117 from the conduit 234 with the result that there is no pressure in the conduit 231. The pressure in the conduit 228 is independently of the intake manifold vacuum with the result that the force applied to the 1-2 valve is always constant without respect to the conditions. That is, as shown in FIG. 8 at the 1 position of the manual selector valve 103 the speed is shifting from the second to the first speed ratio. Thus, in the hydraulic control system according to the present invention at the 2 and 1 position of the manual selector valve 103 the fluid pressure applied to the leftmost end of the 1-2 valve 104 is always constant so that even though the manual selector valve 103 is shifted from the 2 to 1 position and then back to the 2 position it always maintains constant pressure. Thus, the shifting may be performed at the same vehicle speed with the result that this overcomes the disadvantages of the prior system which has the disadvantage that the vehicle speed changes due to the change of the throttle opening so that in shifting down it is required to accelerate the engine speed and that in shifting down from the second to the first speed ratio repeatedly the latter has lower vehicle speed to cause no engine braking action due to the fact that the line pressure to be applied to the leftmost end of the 1-2 valve is high at first but low at the second.

It is an advantage of the system according to the present invention that the engine braking action is effectively accomplished by selecting the pressure to be applied to the leftmost end of the 1-2 valve properly so as to prevent the overrun of the engine speed.

Through selecting the most high speed of the speed at which the vehicle may not overdrive for the shifting speed from the second to the first, the engine braking in the system of the invention is always so effective that the shifting down operation is reliable at an emergency.

As seen in FIG. 8, the speed shifting from the first to the second may not occur until the vehicle speed exceeds the shifting point from the second to the first because upon the 1 position of the manual selector valve 103 the 1-2 valve spool is biased to the right in first speed by the pressure in the 2-3 shift plug 107 and conduit 220 which urge the 1-2 valve spool 326 rightwards, but which is cut off by the 1-2 valve and 328 in the left, upshifted position. Therefore, it is possible to prevent the speed shifting from the first to the second by selecting the shifting point from the first to the second which is higher than the rotational frequency of the engine which is highest.

I claim:

1. In a hydraulic control system of an automatic control multiratio transmission for a motor vehicle having an engine-driven input, an output for driving said motor vehicle, gear means for operatively connecting said input and output to provide a plurality of forward drive ratios and friction elements for selectively connecting said gear means to said input and output, an automatic multiratio transmission control system including in combination a source of regulated pressure for providing a main fluid pressure in the main passage thereof, a manual selector valve communicating with said source for manually selecting the speed ranges of said motor vehicle to selectively open and close a plurality of the output ports thereof in accordance with said speed ranges selected, a 1-2 speed shift valve communicating with said manual selector valve for distributing the fluid pressure to said friction elements to shift said speed ranges between the first and second speeds, a throttle vacuum-sensitive valve for controlling said 1-2 speed shift valve by providing a throttle fluid pressure thereto responsive to the throttle vacuum level in the engine, a kickdown valve communicating with said manual selector valve for providing the kickdown fluid pressure to said 1-2 speed shift valve in accordance with the kickdown motion of the accelerator, and comprising a 2-1 schedule valve means operatively connected to said 1-2 speed shift valve and said manual selector valve for selectively providing a regulated fluid pressure to said 1-2 valve, and a kickdown cutoff valve means operatively connected to said 1-2 speed shift valve and said kickdown valve for selectively passing therethrough the kickdown fluid pressure from said kickdown valve to said 1-2 speed shift valve.

2. A hydraulic control system according to claim 1, wherein said hydraulic control system further comprises a throttle backup valve means for providing a modulated fluid pressure without respect to the intake manifold vacuum and including a axially movable spool accommodated in the bore of a cylindrical housing having five ports spaced from each other, of which a first port is adapted to introduce the fluid pressure delivered from said manual selector valve, a second port to feed a modulated pressure to said throttle valve, a third port to introduce the fluid pressure delivered from said 1-2 speed shift valve, and the remainder are drain ports, said movable spool having thereon three lands differently sized and a bore apertured between said first and second land and communicated to the area defined by said first land and said housing, and having a biasing spring in the space defined by said housing and said third land, whereby when fluid pressure is applied to said second port only, the modulated fluid pressure is applied to the throttle valve through said third port to prevent said throttle valve from regulating the throttle pressure in response to the intake manifold vacuum.

3. A hydraulic control system according to claim 1, wherein said 2-1 schedule valve means including a axially movable 2-1 schedule valve spool accommodated in the bore of a cylindrical housing having eight ports of which a first and second ports are drain ports and the third port is connected to said 1-2 valve to apply a regulated pressure and a fourth port is connected to said selector valve and a fifth port is connected to said selector valve and a fifth port is opened to the space between said 2-1 schedule valve and said kickdown cutoff valve, said spool having thereon two lands differently sized and positioned relative to said first, second and third ports to selectively open and close the same, a biasing spring accommodated in the chamber defined by said housing and said first land, whereby as the fluid pressure is applied to said space through said fifth port, said spool is urged rightwardly against said spring so that a regulated fluid pressure is applied to said 1-2 schedule valve to shift said 1-2 valve against a governor pressure.

4. A hydraulic control system according to claim 1, wherein said kickdown cutoff valve means including an axially movable kickdown cutoff valve spool accommodated coaxially with the 2-1 schedule spool in the bore of the cylindrical housing having eight ports of which a first, second, third and fourth ports are corresponding to said 2-1 schedule valve and a fifth port is opened to the space between said 2-1 schedule valve and said kickdown cutoff valve and a sixth port is connected to said 1-2 valve and a seventh port is connected to said kickdown valve and a eighth port is a drain, said kickdown cutoff spool having thereon two lands positioned relative to said sixth, seventh and eighth ports, a biasing spring accommodated in the chamber defined by said housing and said second land to urge said kickdown cutoff valve spool rightwardly, whereby as fluid pressure is not applied to said cavity through said sixth port, said kickdown cutoff valve spool is urged to the rightmost by said biasing spring so that said second land closes the seventh port to prevent the kickdown pressure from being applied to said 1-2 valve.

5. A hydraulic control system according to claim 1, wherein said hydraulic control system further comprises a second speed-locking valve means for maintaining said second speed disregarding the change in the governor and throttle valve pressures, and including an axially movable spool accommodated valve in a bore of a housing having four ports of which a first and a fourth ports are communicating with the source of hydraulic pressure through said manual selector valve, a second port being connected to said 1-2 valve, a third port connected to the actuator of a friction element, said spool having two lands therein positioned relative to said four ports to selectively open and close the same; a biasing spring accommodated in the space defined by said first land and said housing, whereby the fluid pressure is applied to the space defined by said second land and said housing through said fourth port, said spool being urged rightwardly so that the fluid pressure from the fourth port is delivered through said third port to said actuator to maintain the second speed gear ratio.